(12) United States Patent
Li et al.

(10) Patent No.: US 9,803,345 B1
(45) Date of Patent: Oct. 31, 2017

(54) SINGLE WATERWAY SHAFT STRUCTURE

(71) Applicant: Xiamen Lota International Co., Ltd., Xiamen (CN)

(72) Inventors: Keping Li, Xiamen (CN); Canzhong Zeng, Xiamen (CN)

(73) Assignee: XIAMEN LOTA INTERNATIONAL CO., LTD., Xiamen, Fujian (CN)

( * ) Notice: Subject to any disclaimer, the term of this patent is extended or adjusted under 35 U.S.C. 154(b) by 23 days.

(21) Appl. No.: 15/182,622

(22) Filed: Jun. 15, 2016

(51) Int. Cl.
| F16K 25/00 | (2006.01) |
| E03C 1/04  | (2006.01) |
| F16K 27/12 | (2006.01) |
| F16K 5/00  | (2006.01) |
| F16K 15/03 | (2006.01) |

(52) U.S. Cl.
CPC .......... *E03C 1/0408* (2013.01); *E03C 1/0409* (2013.01); *F16K 5/00* (2013.01); *F16K 27/12* (2013.01); *F16K 15/03* (2013.01); *Y10T 137/7504* (2015.04)

(58) Field of Classification Search
CPC ........ E03C 1/0408; E03C 1/0409; F16K 5/00; F16K 27/12; F16K 15/03; Y10T 137/7504
See application file for complete search history.

(56) References Cited

U.S. PATENT DOCUMENTS

| 4,022,242   | A  | * | 5/1977  | Turecek  | F16K 11/0746 |
|             |    |   |         |          | 137/100      |
| 4,386,584   | A  | * | 6/1983  | Calkins  | G05D 23/022  |
|             |    |   |         |          | 123/41.08    |
| 5,341,845   | A  | * | 8/1994  | Graber   | F16K 11/0746 |
|             |    |   |         |          | 137/454.2    |
| 5,931,374   | A  | * | 8/1999  | Knapp    | F16K 11/0743 |
|             |    |   |         |          | 137/625.41   |
| 5,970,534   | A  | * | 10/1999 | Breda    | E03C 1/023   |
|             |    |   |         |          | 137/218      |
| 6,016,830   | A  | * | 1/2000  | Niakan   | F16K 3/08    |
|             |    |   |         |          | 137/270      |
| 6,112,342   | A  | * | 9/2000  | Breda    | E03C 1/023   |
|             |    |   |         |          | 137/218      |
| 6,123,105   | A  | * | 9/2000  | Yang     | F16K 11/0743 |
|             |    |   |         |          | 137/270      |
| 9,151,406   | B2 | * | 10/2015 | Deutsch  | F16K 11/0743 |
| 9,677,680   | B2 | * | 6/2017  | Tempel   | F16K 31/002  |
| 2012/0055888 | A1 | * | 3/2012  | Hunter   | B05B 1/18    |
|             |    |   |         |          | 210/806      |
| 2016/0251837 | A1 | * | 9/2016  | Brown    | E03C 1/0408  |

* cited by examiner

*Primary Examiner* — Craig Schneider
*Assistant Examiner* — Kevin Barss
(74) *Attorney, Agent, or Firm* — Leong C. Lei

(57) ABSTRACT

A single waterway shaft structure includes a valve housing, a valve cover, a temperature control rod assembly composed of a water stopper and a temperature adjustment rod, a spring, and a gasket. A lower portion of the temperature control rod assembly is formed with an eccentric water hole. The gasket and the spring are placed in an eccentric water inlet of the valve housing in order and confined in the valve housing. The temperature control rod assembly cooperates with a faucet handle. A one-way connecting structure is provided between the valve cover and the valve housing. An upper end of the valve cover is provided with a fan-shaped limit block for limiting the turning angle of the temperature control rod assembly. The shaft is designed to be one-piece.

9 Claims, 9 Drawing Sheets

250
SINGLE WATERWAY SHAFT STRUCTURE

BACKGROUND OF THE INVENTION

1. Field of the Invention

The present invention relates to a shower device, and more particularly to a single waterway shaft structure used for a dual-handle faucet.

2. Description of the Prior Art

A wall-mounted shower faucet doesn't occupy much space, so it is widely used. The main body of the faucet is embedded in the wall. There is a distance from the main body of the faucet to the wall. An existing wall-mounted shower faucet is provided with a normal shaft and an elongate connecting rod in order to ensure the space for the faucet handle mounted on the wall. The shaft having a stainless steel water stopper is cost-effective relative to the shaft having a ceramic plate, so the former is used increasingly. The main body of the shower faucet shaft having a water stopper must be processed for an eccentric hole. As shown in FIG. 11, in a conventional faucet structure, an eccentric hole of a main body is provided with a gasket 50' and a spring 40', a shaft A is assembled to the faucet, a connecting shaft B is fitted on the shaft, and a press cover is locked tightly. This faucet has some drawbacks. If there is an anomaly when finished products are assembled or when in use, it is required to replace the shaft. The main body is embedded in the wall. The gasket 50' and the spring 40' don't be restrained, so they may drop out of the main body when the shaft is replaced. Sometimes, they may be lost. Even though the shaft is replaced with a new one, the faucet is still leaking. Besides, the shaft and the main body don't have a fool-proofing configuration. The shaft may be installed reversely when replaced. Thus, the faucet is still leaking. These situations bring many troubles and problems for use. Accordingly, the inventor of the present invention has devoted himself based on his many years of practical experiences to solve these problems.

SUMMARY OF THE INVENTION

The primary object of the present invention is to provide a single waterway shaft structure. The single waterway shaft structure can be assembled conveniently and prevent its parts from losing.

In order to achieve the aforesaid object, the single waterway shaft structure of the present invention comprises a valve housing, a valve cover, a temperature control rod assembly composed of a water stopper and a temperature adjustment rod, a spring, and a gasket. The bottom of the valve housing is formed with an eccentric water inlet. A side wall of the valve housing is formed with a water outlet. A lower portion of the temperature control rod assembly is formed with an eccentric water hole. A side portion of the temperature control rod assembly is formed with an opening in communication with the water hole. The gasket and the spring are placed in the eccentric water inlet of the valve housing in order and are pressed by the water stopper at the lower portion of the temperature control rod assembly. Through the valve cover to cooperate with the valve housing, the gasket, the spring, and the temperature control rod assembly are confined in the valve housing. A rear portion of the temperature adjustment rod of the temperature control rod assembly passes through the valve cover and extends out of the valve cover to form a guide end to mate with a faucet handle. A one-way connecting structure is provided between the valve cover and the valve housing. An upper end of the valve cover is provided with a fan-shaped limit block for limiting the turning angle of the temperature control rod assembly.

Preferably, the one-way connecting structure includes at least two sunken troughs formed in a lower portion of the valve cover, at least two through troughs in communication with an outer side wall of the valve cover, positioning shoulder blocks provided on the valve housing and corresponding in number to the sunken troughs so as to engage with the sunken troughs, and engaging buckles provided on the valve housing and corresponding in number to the through troughs so as to engage with the through troughs.

Preferably, one pair or more of the sunken troughs or the through troughs are guide troughs, and one pair or more of the positioning shoulder blocks and the engaging buckles are guide configurations.

Preferably, the sunken troughs and the through troughs are disposed on the valve housing, and the positioning shoulder blocks and the engaging buckles are disposed on the valve cover to constitute the one-way connecting structure.

Preferably, one pair or more of the sunken troughs or the through troughs are guide troughs, and one pair or more of the positioning shoulder blocks and the engaging buckles are guide configurations.

Preferably, a lower surface of the valve housing is provided with an eccentric cylinder. The eccentric water inlet is disposed in the eccentric cylinder in communication with the interior of the valve housing. An inner side wall and a bottom side wall of the valve housing define a circular space therebetween. The circular space has an eccentric cylinder hole therein. The eccentric water inlet is disposed at the bottom of the eccentric cylinder hole. The gasket and the spring are installed in the eccentric cylinder hole. The water outlet is disposed between the inner side wall and an outer side wall of the valve housing to communicate with the inner side wall and the outer side wall.

Preferably, a lower portion of the valve cover is formed with a first chamber. An upper portion of the valve cover is formed with a second chamber. The first chamber is placed and sealed in the valve housing or fitted on the valve housing in a sealing way. The second chamber is adapted for insertion of the temperature adjustment rod.

Preferably, the water stopper of the temperature control rod assembly is provided with the water hole in a crescent shape and hooks at two sides thereof to cooperate with the temperature adjustment rod. The water stopper is attached to the gasket to form a water flow switch. The temperature control rod assembly passes through the circular space of the valve housing and the first chamber and the second chamber of the valve cover to form a sealing match.

Preferably, the water stopper is one of a stainless steel plate, a plastic plate, a composite plate, and a ceramic plate.

Accordingly, the spring and the gasket of the present invention are assembled to the valve housing through the valve cover and the temperature control rod assembly to become one-piece, such that the parts become a unit to ensure the assembly and replacement of the parts. It is not easy to lose the parts. The one-way connecting structure of the valve cover and the valve housing can ensure the uniqueness of the shaft to be assembled to the faucet, so that the shaft won't be installed reversely. The assembly of the shaft is quick and convenient. The present invention can solve the problems of the prior art.

DETAILED DESCRIPTION OF THE PREFERRED EMBODIMENTS

Figure 1:
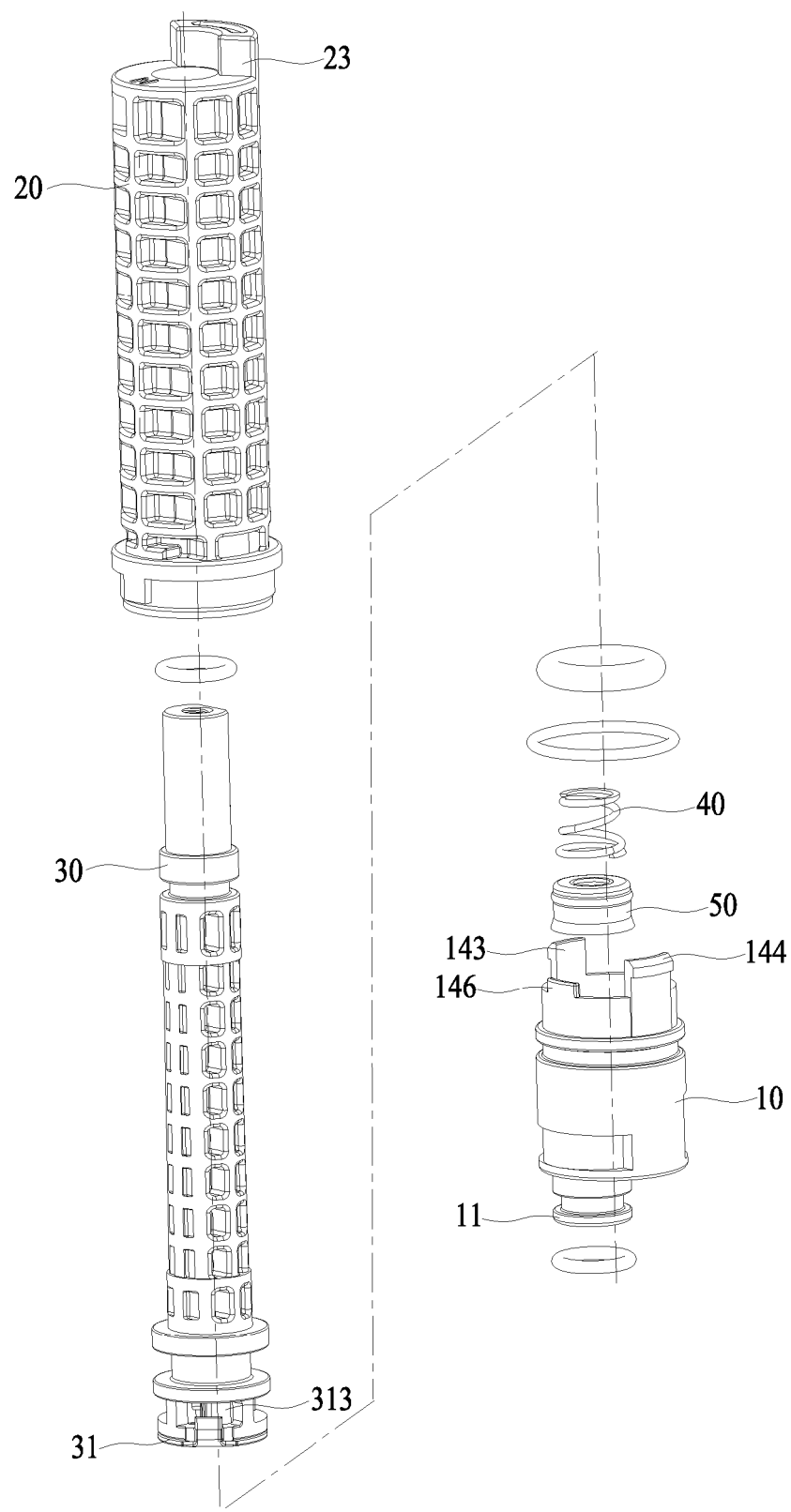
FIG. 1 is an exploded view in accordance with a preferred embodiment of the present invention.
Figure 2:
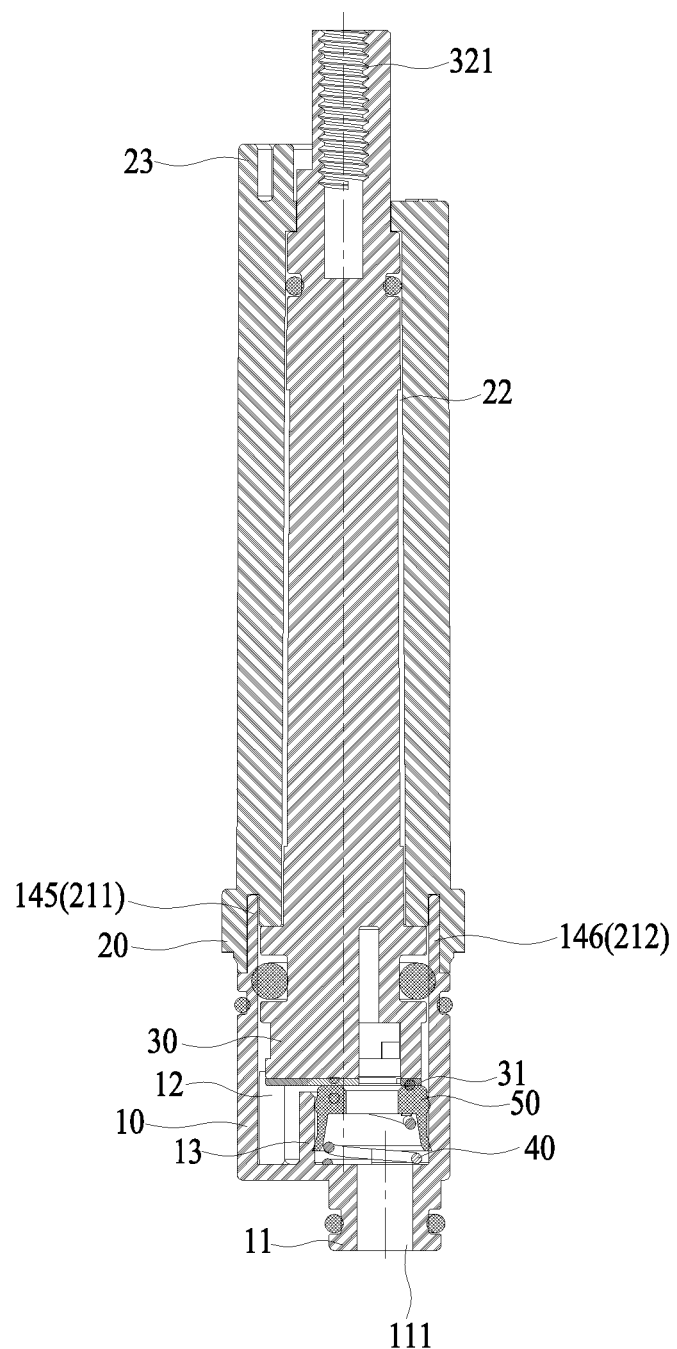
FIG. 2 is a sectional view in accordance with the preferred embodiment of the present invention.

Embodiments of the present invention will now be described, by way of example only, with reference to the accompanying drawings.

As shown in FIG. 1 through FIG. 10D, the present invention discloses a single waterway shaft structure. The single waterway shaft structure comprises a valve housing 10, a valve cover 20, a temperature control rod assembly 30 composed of a water stopper 31 and a temperature adjustment rod 32, a spring 40, and a gasket 50. A bottom of the valve housing 10 is formed with an eccentric water inlet 111. A side wall of the valve housing 10 is formed with a water outlet 147. A lower portion of the temperature control rod assembly 30 is formed with an eccentric water hole 310. A side portion of the temperature control rod assembly 30 is formed with an opening 313 in communication with the water hole 310. The feature of the present invention is described hereinafter.

The gasket 50 and the spring 40 are placed in the eccentric water inlet 111 of the valve housing 10 in order and are pressed by the water stopper 31 at the lower portion of the temperature control rod assembly 30. Through the valve cover 20 in cooperation with the valve housing 10, the gasket 50, the spring 40, and the temperature control rod assembly 30 are confined in the valve housing 10. A rear portion of the temperature adjustment rod 32 of the temperature control rod assembly 30 passes through the valve cover 20 and extends out of the valve cover 20 to form a guide end 321 to mate with a faucet handle. A one-way connecting structure is provided between the valve cover 20 and the valve housing 10.

As shown in FIG. 4, FIG. 5, FIG. 7 and FIG. 8, the one-way connecting structure includes at least two sunken troughs 211, 212 formed in a first chamber 21 at a lower portion of the valve cover 20, at least two through troughs 213, 214 in communication with an outer side wall of the valve cover 20, at least two positioning shoulder blocks 145, 146 provided on the valve housing 10 to engage with the sunken troughs 211, 212, and at least two engaging buckles 143, 144 provided on the valve housing 10 to engage with the through troughs 213, 214. Thus, a one-way fitting relationship is formed between the valve cover 20 and the valve housing 10 to ensure the precision of the turning of the temperature control rod assembly 30.

That is to say, a fan-shaped limit block 23 is provided at an upper end of the valve cover 20 to limit the turning angle of the temperature control rod assembly 30 precisely.

The sunken troughs and the through troughs may be disposed on the valve housing 10, and the positioning shoulder blocks and the engaging buckles may be disposed on the valve cover 20 to achieve the one-way connecting structure.

The sunken troughs 211, 212 may be changed to through troughs having a width different from that of the through troughs 213, 214, and the positioning shoulder blocks 145, 146 may be changed to engaging hooks having a width different from that of the engaging buckles 143, 144 to achieve the one-way connecting structure. That is to say, one pair or more of the sunken troughs 211, 212 or the through troughs 213, 214 are guide troughs, and one pair or more of the positioning shoulder blocks 145, 146 and the engaging buckles 143, 144 are guide configurations to achieve the one-way connecting structure.

Figure 3:
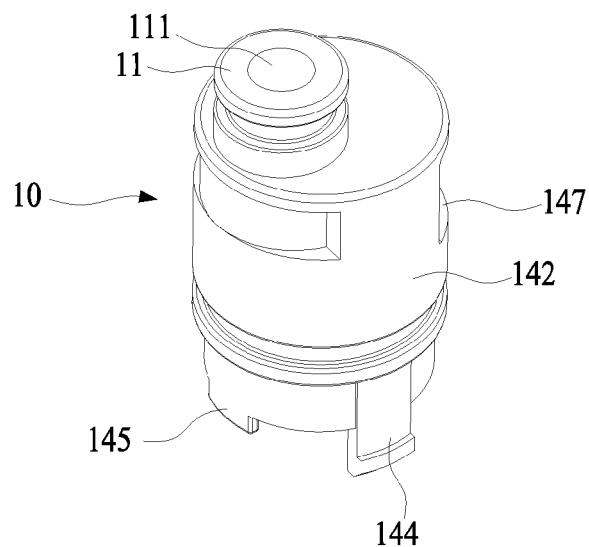
FIG. 3 is a perspective view of the valve housing in accordance with the preferred embodiment of the present invention.
Figure 4:
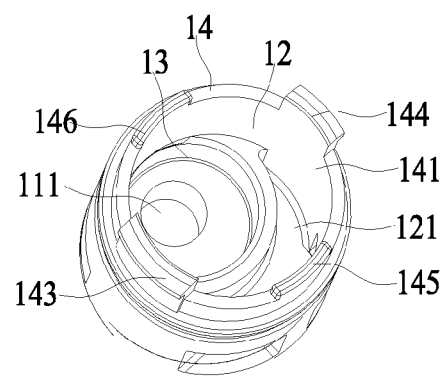
FIG. 4 is a schematic view showing the interior of the valve housing in accordance with the preferred embodiment of the present invention.
Figure 5:
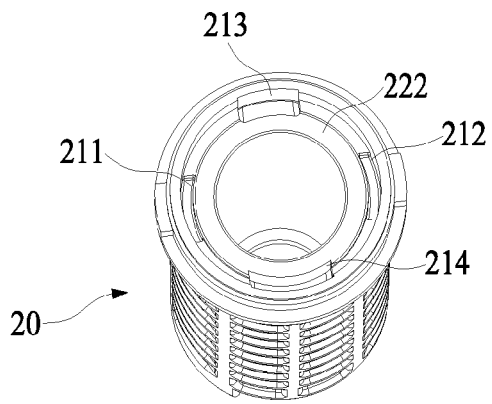
FIG. 5 is a schematic view showing the interior of the valve cover in accordance with the preferred embodiment of the present invention.

As shown in FIG. 3 and FIG. 4, a lower surface of the valve housing 10 is provided with an eccentric cylinder 11. The eccentric water inlet 111 is disposed in the eccentric cylinder 11 in communication with the interior of the valve housing 10. An inner side wall 141 and a bottom side wall 121 of the valve housing 10 define a circular space 12 therebetween. The circular space 12 has an eccentric cylinder hole 13 therein. The eccentric water inlet 111 is disposed at the bottom of the eccentric cylinder hole 13. The gasket 50 and the spring 40 are installed in the eccentric cylinder hole 13. The water outlet 147 is disposed between the inner side wall 141 and an outer side wall 142 of the valve housing 10 to communicate with the inner side wall 141 and the outer side wall 142.

Figure 6:
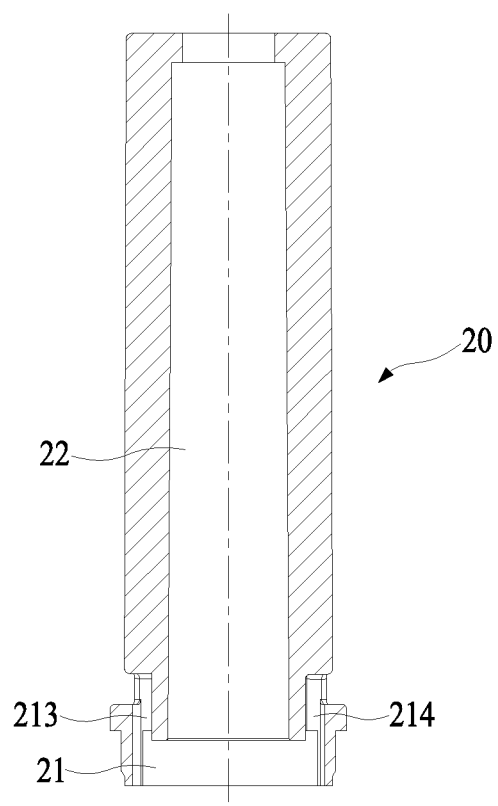
FIG. 6 is a sectional view showing the interior of the valve cover in accordance with the preferred embodiment of the present invention.
Figure 7:
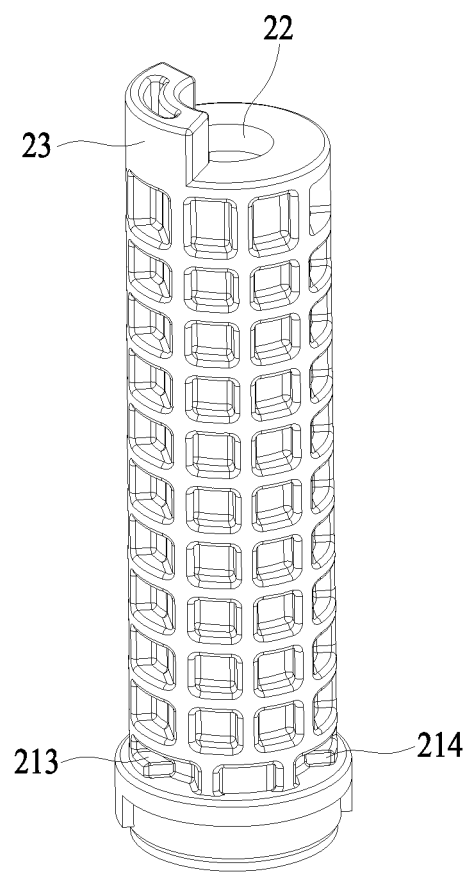
FIG. 7 is a perspective view of the valve cover in accordance with the preferred embodiment of the present invention.

As shown in FIG. 6 and FIG. 7, the lower portion of the valve cover 20 is formed with the first chamber 21, and an upper portion of the valve cover 20 is formed with a second chamber 21. The first chamber 21 is placed and sealed in the valve housing 10, and the second chamber 22 is adapted for insertion of the temperature adjustment rod 32.

Figure 8:
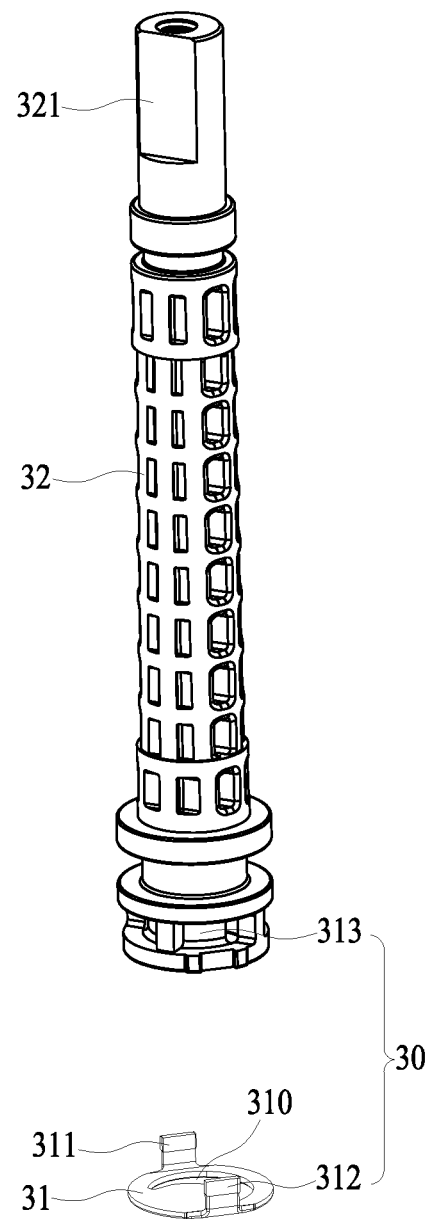
FIG. 8 is a perspective view of the temperature control rod assembly in accordance with the preferred embodiment of the present invention.

As shown in FIG. 8, the water stopper 31 at the bottom of the temperature control rod assembly 30 is provided with the crescent water hole 310 and hooks 311, 312 at two sides thereof to cooperate with the temperature adjustment rod 32. The water stopper 31 is attached to the gasket 50 to form a water flow switch. The temperature control rod assembly 30 passes through the circular space 12 of the valve housing 10 and the first chamber 21 and the second chamber 22 of the valve cover 20. The portion of the temperature control rod assembly 30, embedded in the circular space of the valve housing 10, forms a sealing match. The portion of the temperature control rod assembly 30, embedded in the second chamber 22 of the valve cover 20, is mated with the inner side wall of the second chamber 22.

Figure 9:
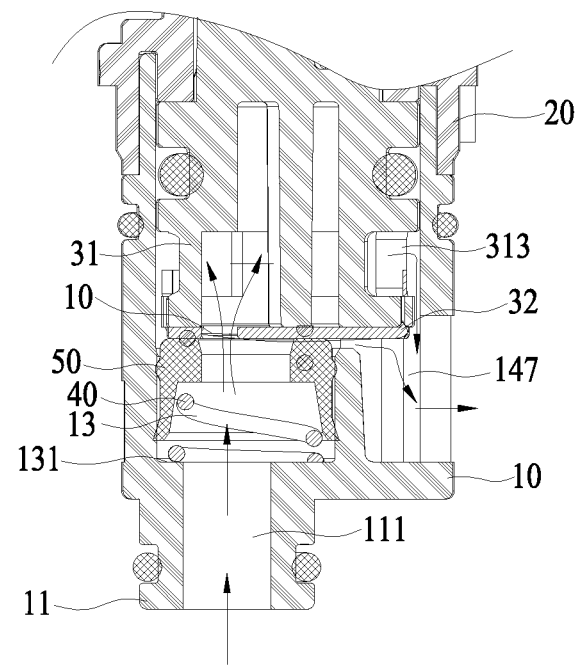
FIG. 9 is a schematic view showing the water route in accordance with the preferred embodiment of the present invention.
Figure 10A:
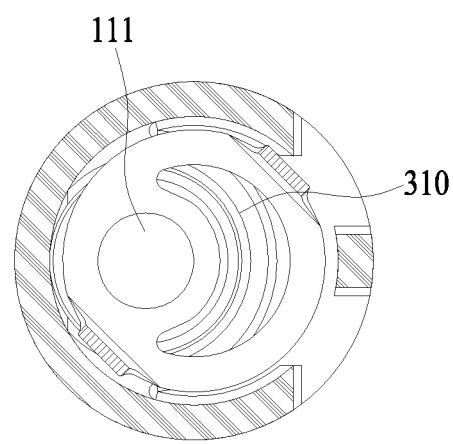
FIG. 10A to FIG. 10D are schematic views showing the operation of the preferred embodiment of the present invention.
Figure 10B:
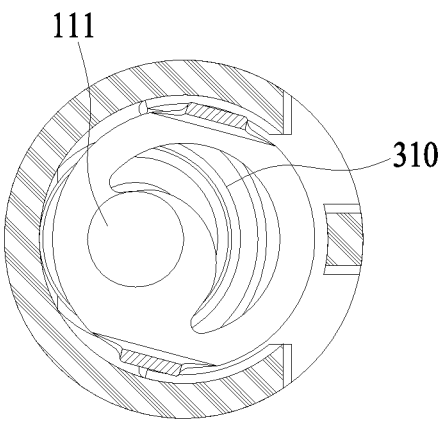
Figure 10C:
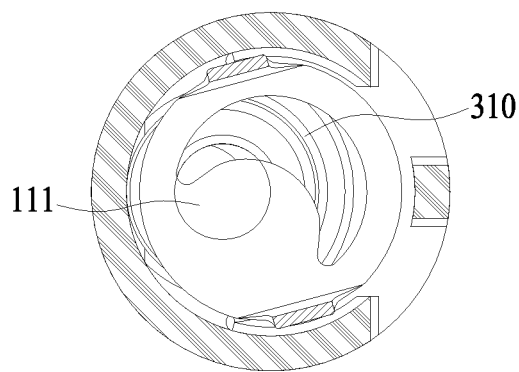
Figure 10D:
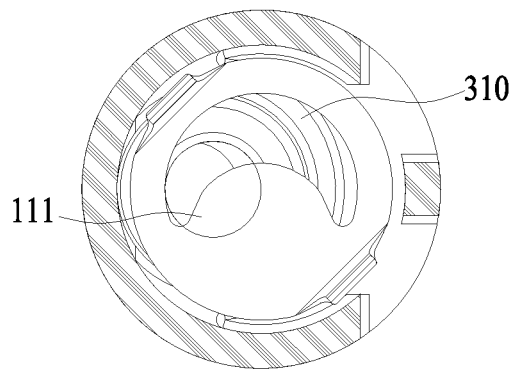
Figure 11:
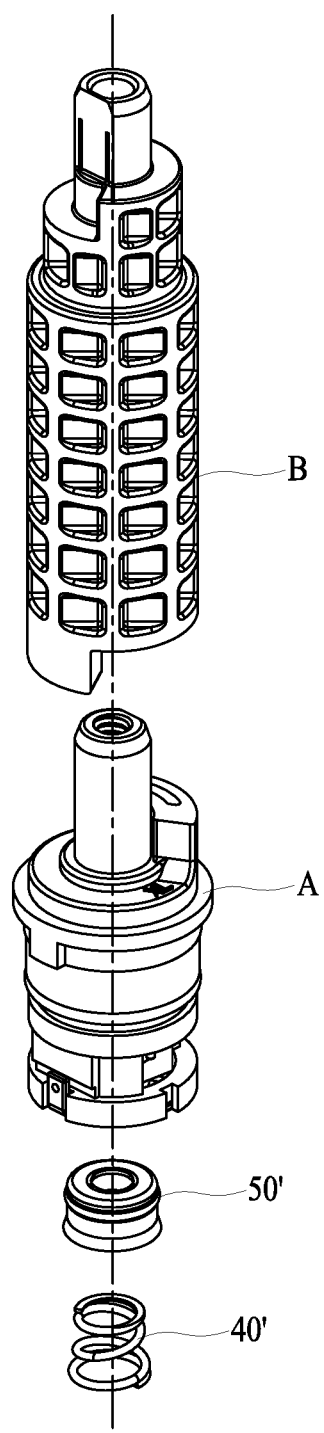
FIG. 11 is an exploded view of a conventional shaft structure for a single handle faucet.

Referring to FIG. 9 to FIG. 10D, through the one-way connecting structure of the valve cover 20 and the valve housing 10, the temperature control rod assembly 30, the valve cover 20, and the valve housing 10 are assembled together. The fan-shaped limit block 23 of the valve cover 20 is to ensure the working area of the temperature control rod assembly 30. The uniqueness of the installation position of the eccentric water inlet of the valve housing 10 and the dual-handle faucet main body enables the shaft to be installed at a unique position no matter at a cold water pipe or a hot water pipe, and the turning directions are disposed symmetrically.

The water stopper 31 can be a stainless steel plate, a plastic plate, a composite plate, or a precise ceramic plate.

The spring 40 and the gasket 50 of the present invention are assembled to the valve housing 10 through the valve cover 20 and the temperature control rod assembly 30 to become one-piece, such that the parts become a unit to ensure the assembly and replacement of the parts. It is not easy to lose the parts. The one-way connecting structure of the valve cover 20 and the valve housing 10 can ensure the uniqueness of the shaft to be assembled to the faucet, so that the shat won't be installed reversely. The assembly of the shaft is quick and convenient. The present invention can solve the problems of the prior art.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A single waterway shaft structure, comprising a valve housing, a valve cover, a temperature control rod assembly composed of a water stopper and a temperature adjustment rod, a spring, and a gasket; a bottom of the valve housing being formed with an eccentric water inlet, a side wall of the valve housing being formed with a water outlet; a lower portion of the temperature control rod assembly being formed with an eccentric water hole, a side portion of the temperature control rod assembly being formed with an opening in communication with the water hole; characterized in that: the gasket and the spring are placed in the eccentric water inlet of the valve housing in order and are pressed by the water stopper at the lower portion of the temperature control rod assembly, through the valve cover to cooperate with the valve housing, the gasket, the spring, and the temperature control rod assembly are confined in the valve housing, a rear portion of the temperature adjustment rod of the temperature control rod assembly passes through the valve cover and extends out of the valve cover to form a guide end to mate with a faucet handle; a one-way connecting structure is provided between the valve cover and the valve housing; and an upper end of the valve cover is provided with a fan-shaped limit block for limiting a turning angle of the temperature control rod assembly.

2. The single waterway shaft structure as claimed in claim 1, wherein the one-way connecting structure includes at least two sunken troughs formed in a lower portion of the valve cover, at least two through troughs in communication with an outer side wall of the valve cover, positioning shoulder blocks provided on the valve housing and corresponding in number to the sunken troughs so as to engage with the sunken troughs, and engaging buckles provided on the valve housing and corresponding in number to the through troughs so as to engage with the through troughs.

3. The single waterway shaft structure as claimed in claim 2, wherein one pair or more of the sunken troughs or the through troughs are guide troughs, and one pair or more of the positioning shoulder blocks and the engaging buckles are guide configurations.

4. The single waterway shaft structure as claimed in claim 1, wherein the sunken troughs and the through troughs are disposed on the valve housing, and the positioning shoulder blocks and the engaging buckles are disposed on the valve cover to constitute the one-way connecting structure.

5. The single waterway shaft structure as claimed in claim 4, wherein one pair or more of the sunken troughs or the through troughs are guide troughs, and one pair or more of the positioning shoulder blocks and the engaging buckles are guide configurations.

6. The single waterway shaft structure as claimed in claim 1, wherein a lower surface of the valve housing is provided with an eccentric cylinder, the eccentric water inlet is disposed in the eccentric cylinder in communication with an interior of the valve housing, an inner side wall and a bottom side wall of the valve housing define a circular space therebetween, the circular space has an eccentric cylinder hole therein, the eccentric water inlet is disposed at a bottom of the eccentric cylinder hole, the gasket and the spring are installed in the eccentric cylinder hole, and the water outlet is disposed between the inner side wall and an outer side wall of the valve housing to communicate with the inner side wall and the outer side wall.

7. The single waterway shaft structure as claimed in claim 1, wherein a lower portion of the valve cover is formed with a first chamber, an upper portion of the valve cover is formed with a second chamber, the first chamber is placed and sealed in the valve housing or fitted on the valve housing in a sealing way, and the second chamber is adapted for insertion of the temperature adjustment rod.

8. The single waterway shaft structure as claimed in claim 1, wherein the water stopper of the temperature control rod assembly is provided with the water hole in a crescent shape and hooks at two sides thereof to cooperate with the temperature adjustment rod, the water stopper is attached to the gasket to form a water flow switch; and the temperature control rod assembly passes through the circular space of the valve housing and the first chamber and the second chamber of the valve cover.

9. The single waterway shaft structure as claimed in claim 1, wherein the water stopper is one of a stainless steel plate, a plastic plate, a composite plate, and a ceramic plate.

* * * * *